W. GAIDA.
DRAFT ATTACHMENT FOR TRACTORS.
APPLICATION FILED NOV. 11, 1918.

1,356,705.

Patented Oct. 26, 1920.
2 SHEETS—SHEET 1.

INVENTORS
Wale Gaida
BY John M. Spellman
ATTORNEY.

W. GAIDA.
DRAFT ATTACHMENT FOR TRACTORS.
APPLICATION FILED NOV. 11, 1918.

1,356,705.

Patented Oct. 26, 1920.
2 SHEETS—SHEET 2.

INVENTORS

BY Wale Gaida

John M. Spellman
ATTORNEY.

UNITED STATES PATENT OFFICE.

WALE GAIDA, OF HILLSBORO, TEXAS.

DRAFT ATTACHMENT FOR TRACTORS.

1,356,705.

Specification of Letters Patent.   Patented Oct. 26, 1920.

Application filed November 11, 1918. Serial No. 261,946.

*To all whom it may concern:*

Be it known that I, WALE GAIDA, a citizen of the United States, residing at Hillsboro, in the county of Hill and State of Texas, have invented certain new and useful Improvements in Draft Attachments for Tractors, of which the following is a specification.

My invention relates to improvements in tractors especially that class of tractors used for farming purposes and in such connection it relates more particularly to the novel means employed in the construction and arrangement of such a tractor.

The ordinary farm tractor usually carries as a trailer the planter, cultivator or other farm implement such as is generally drawn by horses or mules, the driver's seat, operating levers, etc., being situated on the implement frame.

The principal object of my invention is the provision of a tractor wherein the planter, cultivator or other farm implement may be embodied in and made a part of the farm tractor.

Another main object of my invention is the provision of a driving mechanism which is so arranged and located as to permit of the interchangeable use of the tractor for the various farm implements.

Another object of my invention resides in the means employed and the arrangement of the steering wheels, and finally, my object is to provide a tractor wherein the power from the engine may be utilized to drive, for instance, a wood saw or to propel other machinery.

My invention will be more fully understood from the following description taken in connection with the accompanying drawings forming part hereof, in which—

Fig. 4 is a detail perspective view of the bar for attaching the various farm implements, and Fig. 5 is a detail perspective view of a portion of the frame and connecting rod with cultivator shovels attached.

Figure 3:
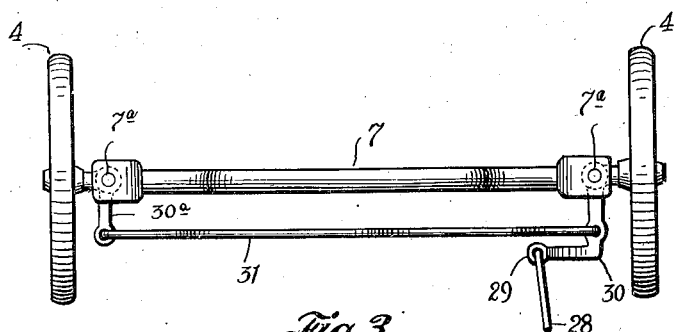
Fig. 3 is a top or plan view of the front wheels and axle, showing the steering arrangement.

Referring to the drawings, 1 represents the hood covering the engine of a tractor, some of the engine parts being indicated, the engine resting on the frame 2 of the tractor, the frame supported by driving wheels 3—3 with the usual gearing and driving rod as shown, and steering wheels 4—4 (see Fig. 3), the driving wheels mounted on an axle 5, the steering wheels on a V shaped axle 7, which steering wheels will be referred to later.

Figure 1:
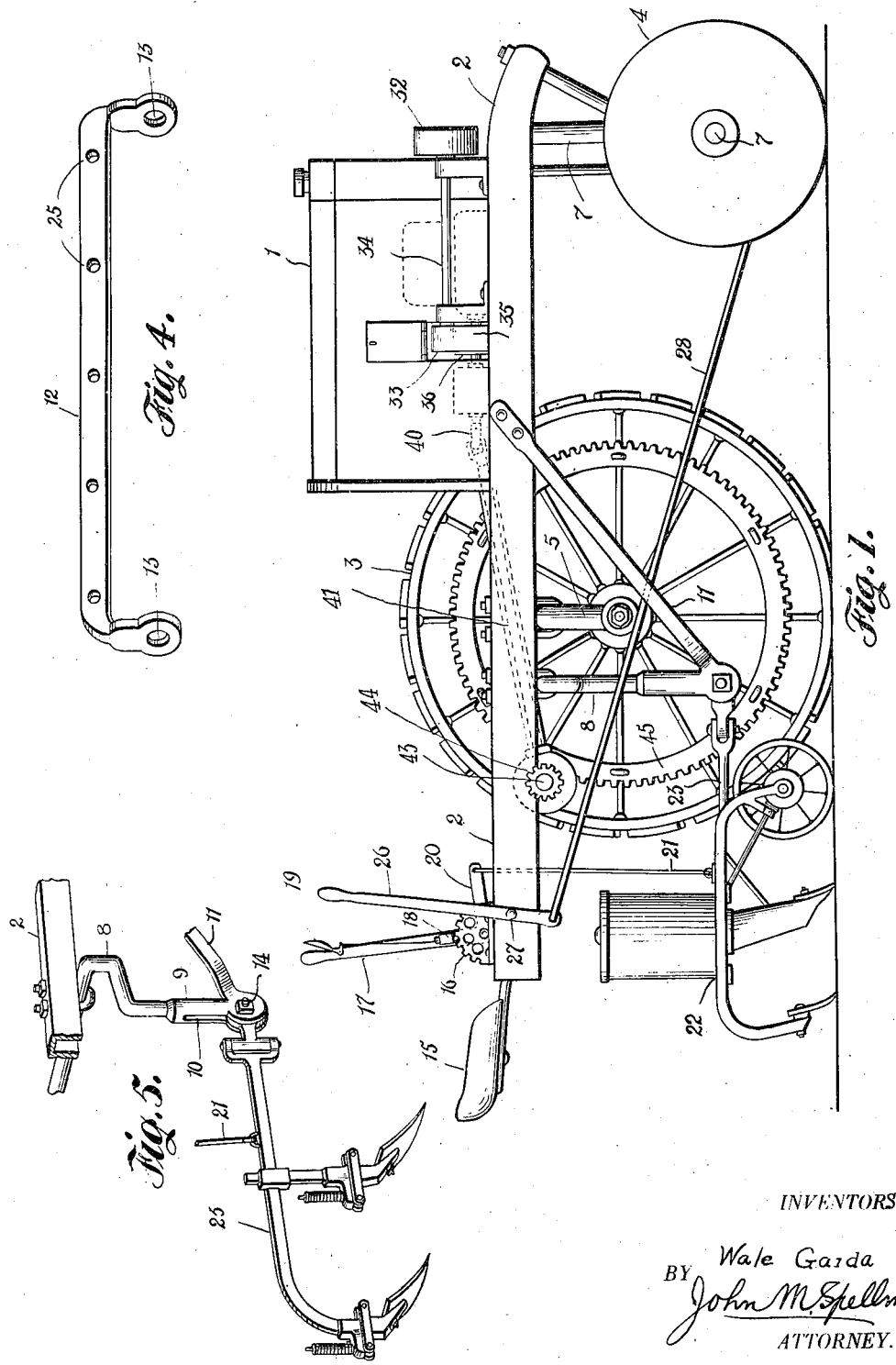
Figure 1 is a side elevational view of a farm tractor embodying my invention, one of the driving wheels removed for better illustration.
Figure 2:
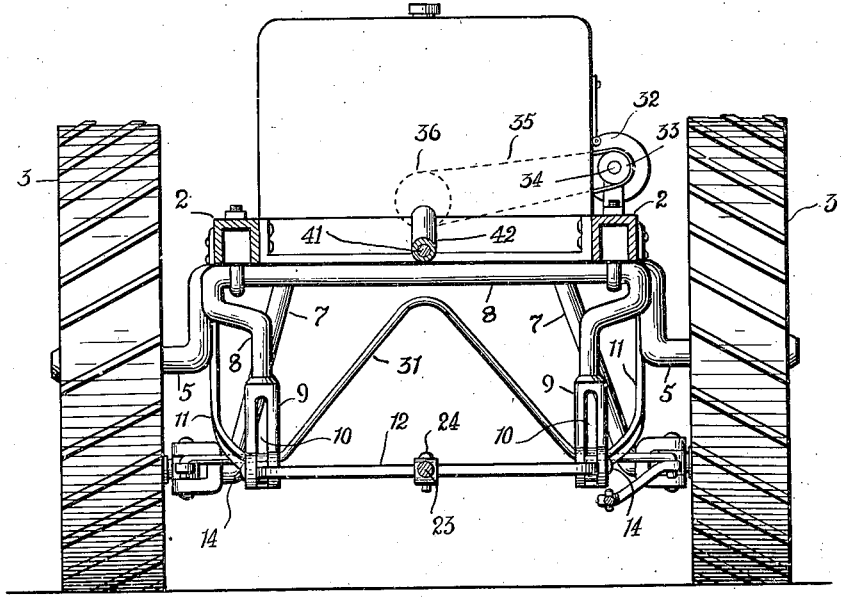
Fig. 2 is a rear elevational view with certain parts removed, a portion of the frame, driving rod, etc., shown in cross section.

Connected to the two parts of the frame 2—2 just behind the rear axle 5 is a horizontal rod 8 which rod is curved downward and then inward as shown in Fig. 2, the two ends of the rod 8 enlarged as at 9 and slotted as indicated at 10. A rod 11 made in one piece with the enlarged slotted end of bar or rod 8 and connected to the frame 2 as shown in Fig. 1, keeps the rod 8 rigid. Between the slots 10 in the ends of rod 8 is placed a slotted or perforated bar 12 (see Fig. 4) which is pivotally connected between said slots through holes 13 in bar 12 by bolts 14.

On the rear end of the frame 2—2 is a seat 15 in front of which is an ordinary sector gear 16 with handle lever 17 and pin and release 18 and 19. The sector gear has a projection or short arm 20 carrying a pivotally connected rod 21 for the up and down movement of the cultivator, etc., when raising or lowering same. The illustration at Fig. 5 shows cultivator shovels attached directly in the slots 10, the perforated or slotted bar 12 being removed, and Fig. 1 at 22 shows a planter attached to the bar 12 by a coupling 23 and pin 24 through one of the holes 25 in the bar 12.

Situated near the sector gear 16 is a guide lever 26 for steering the front wheels of the tractor, the lever arranged to swing on a pin 27 in frame 2. The lower end of this guide lever 26 is pivotally connected to a relatively long rod 28 which is arranged to turn at its opposite end in an eyelet 29 on an arm 30 connected to the front axle 7 of the steering wheels, the axle 7, a short distance inward from the wheel, being pivoted, the wheel and a portion of the axle adapted to swing on a pin 7ª, the arm 30 and a similar arm 30ª being pivotally connected by an upwardly bent rod 31, so that pulling or pushing on the guide lever 26 will swing the front wheels in the desired direction.

The front or steering wheels of the tractor are spaced apart the same distance as the rear or drive wheels to allow of the tractor straddling several rows in the field at the same time, the front axle forming an inverted V shape adapted to straddle the row or rows in the field.

On the side of the frame 2 to the right of the engine is mounted a pulley 32 connected to a similar pulley or belt wheel 33 by a shaft 34, the smaller belt pulley connected by a belt 35 to the fly wheel 36 of the engine. The pulley 32 is adapted for connection with machinery such, for instance, as a wood saw or may be connected to a pump, etc.

In my present invention the driving mechanism is located some distance above the axle to permit the tractor to straddle rows of growing plants when a cultivator is being drawn. As shown in the drawings, the fly wheel shaft 40 of the engine is connected by a universal joint with the power transmission shaft 41 which revolves in a tubular bearing 42 supported on the platform of the tractor. The shaft 41 operates the counter shaft 43 which in turn drives one or both wheels 3 through pinion 44 meshing with the gear wheel 45 fixed to the interior of the wheel 3. The counter shaft 43 has its bearings in the underside of the frame 2 of the tractor.

Having thus described the nature and objects of my invention, what I claim as new and desire to secure by Letters Patent, is—

A draft attachment for a tractor, comprising a horizontal bar, having means for attachment to the tractor frame, said bar being bent downward with its lower ends slotted to receive a relatively long, flat member, formed to fit in and be pivotally connected to the downwardly bent ends of said slotted bar, said long, flat member being perforated for the attachment of an implement.

In testimony whereof I have signed my name to this specification.

WALE GAIDA.